US008667925B2

(12) United States Patent
Christopher et al.

(10) Patent No.: US 8,667,925 B2
(45) Date of Patent: Mar. 11, 2014

(54) METHOD AND APPARATUS FOR LINING A CONDUIT

(75) Inventors: Richard Christopher, Cheshire (GB); Erwin Pearson, Flintshire (GB)

(73) Assignee: HTC Management Services, Ltd (GB)

( * ) Notice: Subject to any disclaimer, the term of this patent is extended or adjusted under 35 U.S.C. 154(b) by 371 days.

(21) Appl. No.: 12/918,583

(22) PCT Filed: Feb. 23, 2009

(86) PCT No.: PCT/GB2009/000481
§ 371 (c)(1), (2), (4) Date: Oct. 14, 2010

(87) PCT Pub. No.: WO2009/103997
PCT Pub. Date: Aug. 27, 2009

(65) Prior Publication Data
US 2011/0024515 A1 Feb. 3, 2011

(30) Foreign Application Priority Data
Feb. 22, 2008 (GB) .................................. 0803297.1

(51) Int. Cl.
*B05B 12/00* (2006.01)
*B05D 7/22* (2006.01)
*F16L 55/164* (2006.01)
*F16L 55/18* (2006.01)
*B05B 13/06* (2006.01)

(52) U.S. Cl.
USPC ............................ 118/317; 138/177; 427/236

(58) Field of Classification Search
USPC ................... 118/306, 317, DIG. 10, DIG. 13; 138/177; 427/230, 236, 237, 239
See application file for complete search history.

(56) References Cited

U.S. PATENT DOCUMENTS

| | | | | |
|---|---|---|---|---|
| 3,858,552 | A * | 1/1975 | Takata et al. | 118/318 |
| 4,913,089 | A * | 4/1990 | Atkins et al. | 118/680 |
| 4,949,744 | A | 8/1990 | Heed et al. | |
| 5,612,499 | A | 3/1997 | Andrew et al. | |
| 6,916,502 | B2 * | 7/2005 | Moore et al. | 427/236 |
| 7,156,320 | B2 * | 1/2007 | Wang et al. | 239/128 |
| 7,851,017 | B2 * | 12/2010 | Wang et al. | 427/237 |

FOREIGN PATENT DOCUMENTS

| | | | |
|---|---|---|---|
| EP | 0 283 192 | A * | 9/1988 |
| EP | 283192 | A1 | 9/1988 |
| FR | 2 580 370 | A * | 10/1986 |
| FR | 2580370 | A1 | 10/1986 |
| GB | 2195416 | A | 4/1988 |
| GB | 2244109 | A | 11/1991 |
| GB | 2247505 | A | 3/1992 |
| GB | 2 361 199 | A * | 10/2001 |
| GB | 2361199 | A | 10/2001 |
| JP | 04296293 | A | 10/1992 |
| NZ | 229466 | A | 2/1991 |
| NZ | 234399 | A | 5/1993 |
| NZ | 238959 | A | 7/1993 |
| WO | WO-2005049220 | A1 | 6/2005 |

* cited by examiner

*Primary Examiner* — William Phillip Fletcher, III
(74) *Attorney, Agent, or Firm* — Gifford, Krass et al

(57) ABSTRACT

An apparatus is disclosed for locating an instrument within a pipe. The apparatus may include body portion defining a cavity therein, a pipe engagement region for slideable engagement with a pipe, and an instrument retention portion for receiving at least a portion of an instrument therein and retaining the instrument in position relative to the body. A method is also disclosed including the use of the apparatus to locate an instrument within a pipe.

12 Claims, 3 Drawing Sheets

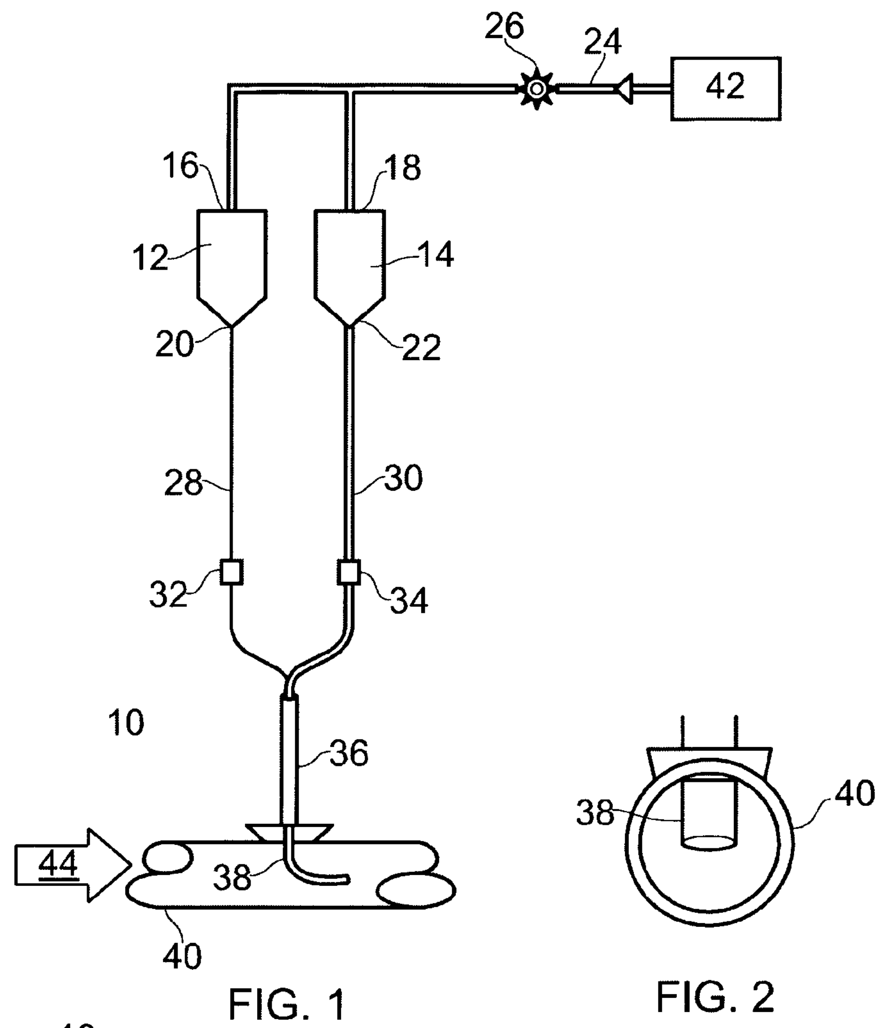
FIG. 1
FIG. 2
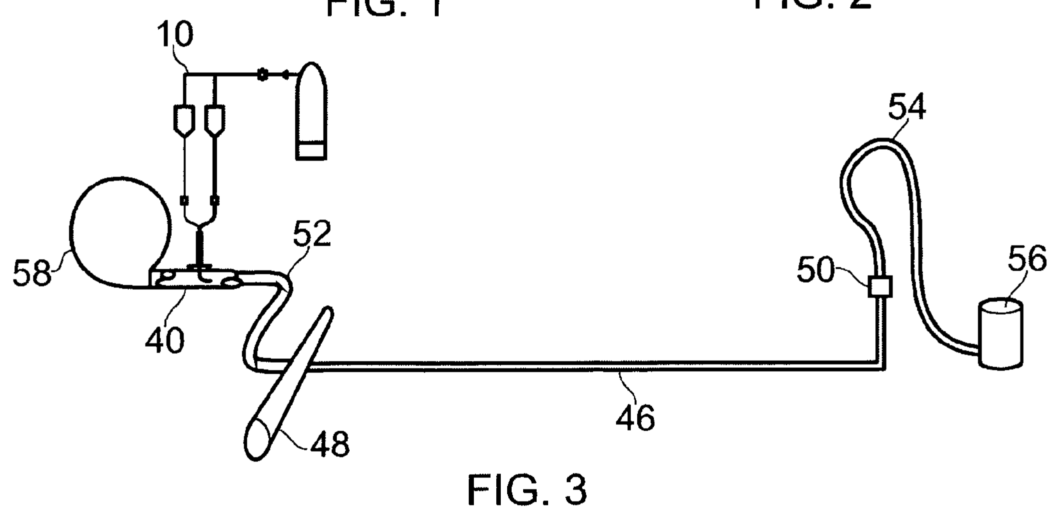
FIG. 3

METHOD AND APPARATUS FOR LINING A CONDUIT

CROSS-REFERENCE TO RELATED APPLICATIONS

This application is the U.S. national phase of PCT/GB2009/000481 filed Feb. 23, 2009, which claims priority of Great Britain Patent Application 0803297.1 filed Feb. 22, 2008.

TECHNICAL FIELD OF THE INVENTION

The present invention relates to lining pipes, including the provision of a method and apparatus to facilitate the lining of damaged utilities pipes using a quick drying lining material such as polyurethane.

DESCRIPTION OF THE RELATED ART

Pipes such as those used to carry water supplies are generally buried underground and thus, difficult to access for repair and maintenance work. There are several reasons why maintenance work may be necessitated. Through age and deterioration utilities pipes may become permeable or cleaning processes may cause damage to the inner pipe surface. For example, tubercles form as a result of corrosion inside steel and cast water mains and consist of layers of corrosion products, such as rust and the like, which build up over time to form lumps and mounds over local areas of metal loss. Tubercles can severely reduce the internal bore of pipes, leading to reduced flow and a necessary increase in pumping pressure to maintain a supply of water though the pipe. The various methods known for removing tubercles, such as using rotating steel flails within the pipe or harsh abrasion techniques, can result in damage to the inner pipe surface.

In order to extend the life of damaged pipes it is frequently necessary to line the inner surface of a pipe with an impermeable material. It is known to provide a rotary sprayer mounted on a small carriage or sledge which can be moved along inside a pipe and sprays a coating compound onto the inner pipe surface; for example U.S. Pat. No. 6,632,475 and European Patent 0145266.

Problematically, such known techniques for lining pipes have limitations where a carriage is unable to pass through pipes of lesser dimensions. In particular, domestic water supply pipes are frequently relatively narrow between the water main and the supply point within individual properties.

It is also known in the art to provide a rotary spray head which is dragged through a pipe which requires lining. The rotary spray head is attached to a high pressure hydraulic umbilical comprising several supply tubes. These tubes supply component parts of a lining compound, heated oil to keep those components fluid, and an air supply to drive the spray head.

Again, such techniques have limitations in terms of the minimum internal pipe diameter through which the spray head can pass or being unable to function if the internal walls of the pipe are uneven or stepped.

The above problems are not restricted to the introduction of just spray heads or lining material delivery systems into pipes, particularly small bore pipes, but such problems also extend to the introduction of other instruments into pipes for the purposes of monitoring conditions within the pipes.

SUMMARY

The present invention seeks to provide a technique for allowing the simple and reliable location of an instrument within a pipe. It is also particularly applicable to use with small bore pipes which are unsuitable for accommodating instruments which require passing through the pipes in order to monitor conditions and/or delivery materials into the pipe such as but not restricted to lining materials. Where used to locate an instrument such as a spray head for lining pipes, the present invention seeks to provide a technique for efficiently and evenly lining pipes, in particular those of lesser or varying internal diameter and to avoid problems caused by spraying devices becoming wedged in pipes.

Accordingly, a first aspect of the present invention provides an apparatus for locating an instrument within a pipe, the apparatus comprising a body portion defining a cavity therein, a pipe engagement region for slideable engagement with a pipe, and an instrument retention portion for receiving at least a portion of an instrument therein and retaining the instrument in position relative to the body.

In this way, the instrument may be reliably located within the body.

In one embodiment, the apparatus further comprises an instrument received within the instrument retention portion and extending at least in part into the cavity.

By extending at least in part into the cavity, the instrument is therefore being reliably located relative to the cavity. Thus, any sliding movement of the body relative to the pipe will result in relative movement between the instrument and the pipe as the instrument is retained in position relative to the body.

The instrument according to any aspect of the present invention preferably comprises a spray head. However, it will be appreciated that the instrument may comprise any instrument which requires location within a pipe, such as but not restricted to, a sensor (including a temperature sensor, air sensor, moisture sensor or the like), a sampling device (including an air sampling device, fluid sampling device, or the like), an injecting device (to inject an additive or the like into the pipe), a camera such as a fiber optic camera device or the like to view the inside of the pipe, or any other suitable instrument which requires reliable location within a pipe.

When in use with a pipe defining a pipe cavity, the pipe engagement region may be slideable relative to the pipe between a first configuration where all or part of the cavity is external to the pipe cavity and a second configuration where all or part of the cavity is located within the pipe cavity.

Preferably, when in the first configuration, the whole of the cavity is located outside of the pipe cavity and/or preferably, when in the second configuration the whole of the cavity is located within the pipe cavity.

The slideable movement of the body relative to the pipe allows the instrument retained within the instrument retention portion to be inserted and removed from the pipe cavity as desired, without disruption to the pipe once the apparatus is in place relative to the pipe.

A second aspect of the present invention provides an apparatus for locating an instrument within a pipe, the apparatus comprising a housing having pipe engagement portions for engagement with a pipe, the housing defining a housing cavity, and a body portion in slideable engagement with the housing, the body portion defining a cavity therein, and having an instrument retention portion for receiving at least a portion of an instrument therein and retaining the instrument in position relative to the body.

Thus, the housing is located in position relative to the pipe in which the instrument is to be located, in use, and engaged with the pipe. Preferably, the housing is sealably engaged with the pipe.

The engagement means may comprise any known engagement means suitable for engaging the housing to the pipe, including but not restricted to, threaded engagement, frictional engagement, bolted engagement, or the like.

The apparatus may further comprise an instrument received within the instrument retention portion and extending at least in part into the cavity.

As mentioned above, the instrument preferably comprises a spray head. However, it will be appreciated that the instrument may comprise any instrument which requires location within a pipe.

In one embodiment, the body portion is slideable relative to the cavity between a first configuration where all or part of the cavity is outside of the housing cavity and a second configuration where all or part of the cavity is located within the housing cavity.

Preferably, when in the first configuration the whole of the cavity is located outside of the housing cavity and/or preferably, when in the second configuration, the whole of the cavity is located within the housing cavity.

Preferably, the housing cavity is contiguous with the pipe cavity following engagement of the apparatus with the pipe. This allows the location of the instrument relative to the pipe to be reliably controlled. Therefore, if the instrument is required to be centrally located within the pipe, then the instrument retention portion can be positioned so as to locate an instrument received therein centrally within the cavity. Thus, when the body is slideably moved relative to the housing so as to align the cavity with the housing cavity, the instrument will be located centrally relative to the pipe cavity as the housing cavity is contiguous relative to the pipe.

A further aspect of the present invention provides a method of locating an instrument within a pipe, the pipe defining a pipe cavity, the method comprising the steps of providing an apparatus according to a second aspect of the present invention, bringing the apparatus into engagement with a pipe, providing an instrument, bringing the instrument into engagement with the instrument retention portion, and sliding the body portion relative to the housing to bring at least a portion of the instrument into the housing cavity.

Preferably, the housing cavity is contiguous with the pipe cavity following engagement of the apparatus with the pipe.

The apparatus and method of the present invention are particularly applicable to applying lining material such as, but not limited to, quick-setting two part lining materials such as polyurethane (PU) and the like, to small bore pipes. With small bore pipes, it is not possible and/or effective to drag a spray head along the pipe to apply the lining material to the interior walls of the pipe. Furthermore, it is not possible to simply attach a delivery tube the pipe in the conventional way to delivery lining material into an air flow to coat the interior surfaces of the pipe as halting the delivery of lining material, once the lining operation is complete, in order to remove the delivery tube from the pipe results in blockage of the delivery tube due to the quick-setting nature of the lining material. Thus, the apparatus of the present invention allows the spray head to be easily inserted into the pipe cavity to deliver lining material into the airflow through the pipe, the simple removal of the spray head from the pipe cavity (whilst still delivering lining material through the spray head) followed by delivery of cleaning fluid through the spray head as full delivery of lining material is halted such that blockage of the spray head is prevented.

In addition, it is possible to take a sample of the lining material both before insertion of the spray head into the pipe cavity and removal of the spray head from the cavity to ensure that the correct mix of lining material has been provided into the air flow. This is clearly not possible using a conventional delivery tube fixed in place to the pipe.

According to a further aspect of the present invention there is provided a method of lining an internal wall of a conduit, the method comprising the steps of carrying a diffused lining material in a fluid flow, and passing the fluid flow through a conduit, wherein the diffused lining material is deposited progressively onto the internal conduit wall.

Advantageously, the present invention enables pipes of various internal diameters to be evenly lined with a lining mix. In particular, benefit is provided by this invention because pipes having a lesser internal diameter can be efficiently lined. The technique is particularly, but not exclusively, effective for lining pipes having an internal diameter of between 15 mm and 50 mm.

The lining material is injected through a nozzle under pressure into the fluid flow. Advantageously, this causes droplets of the lining material to be substantially evenly diffused in the fluid flow. The term diffused denotes a spray or mist in the context of this description.

The method may further comprise the steps of producing the lining material by mixing at least two components under pressure. For example, the at least two components may comprise polyurethane and a hardener compound.

The method may further comprise the steps of curing the deposited lining material by passing heated fluid through the lined conduit.

The fluid flow may be a pressurized gas, preferably air.

According to a further aspect of the present invention there is provided an apparatus for lining a conduit, the apparatus comprising a fluid flow supply providing a fluid flow directed through the conduit, and a diffusion means diffusing a lining material into the fluid flow.

Preferably, the apparatus further comprises a pressure regulator for regulating the pressure at which the lining material is injected into the fluid flow and/or a fluid flow pressure regulator for regulating the pressure of the fluid flow supply such that the diffused lining material is deposited progressively onto the internal conduit wall.

The conduit may be a pipe, preferably a domestic water supply pipe. Preferably, the lining mix is applied to a recently cleaned pipe surface to ensure effective adhesion.

In one embodiment, the diffusion means is an injection system comprising at least one vessel containing components of the lining material, a dispensing tube connected to the exit point of each vessel, each dispensing tube having a internal diameter dependent upon a predetermined ratio of the component to be dispensed from each vessel, and a mixer tube for mixing the components forced through the dispensing tubes and a nozzle for injecting the mixed lining material in a pressurized diffused form.

In one embodiment, the apparatus further comprises a substantially transparent monitoring tube for attaching to the terminal end of the conduit so that the end of the lining process may be observed.

Advantageously, the injection system may be pressurized by a conventional dry compressed gas supply. This has the additional advantage of avoiding any condensation forming in the vessels (which may alternatively be known as pressure pots to the skilled person).

An exhaust filter may be connected at the terminal end of the pipe to be lined or, preferably, to the end of the monitoring tube.

Advantageously, the carrier air supply can also be utilized for curing the lining mix and is conveniently already connected to the lined pipe.

BRIEF DESCRIPTION OF THE DRAWINGS

Embodiments of the present invention will now be described, by way of example, with reference to the accompanying drawings in which:

FIG. 1 is a schematic diagram of an injection system in accordance with a first embodiment of the present invention;

FIG. 2 illustrates a cross-section through the carrier air pipe also including the nozzle;

FIG. 3 is a schematic diagram of the injection system of the present invention in an exemplary operational arrangement;

DETAILED DESCRIPTION OF EMBODIMENTS

Figure 4:
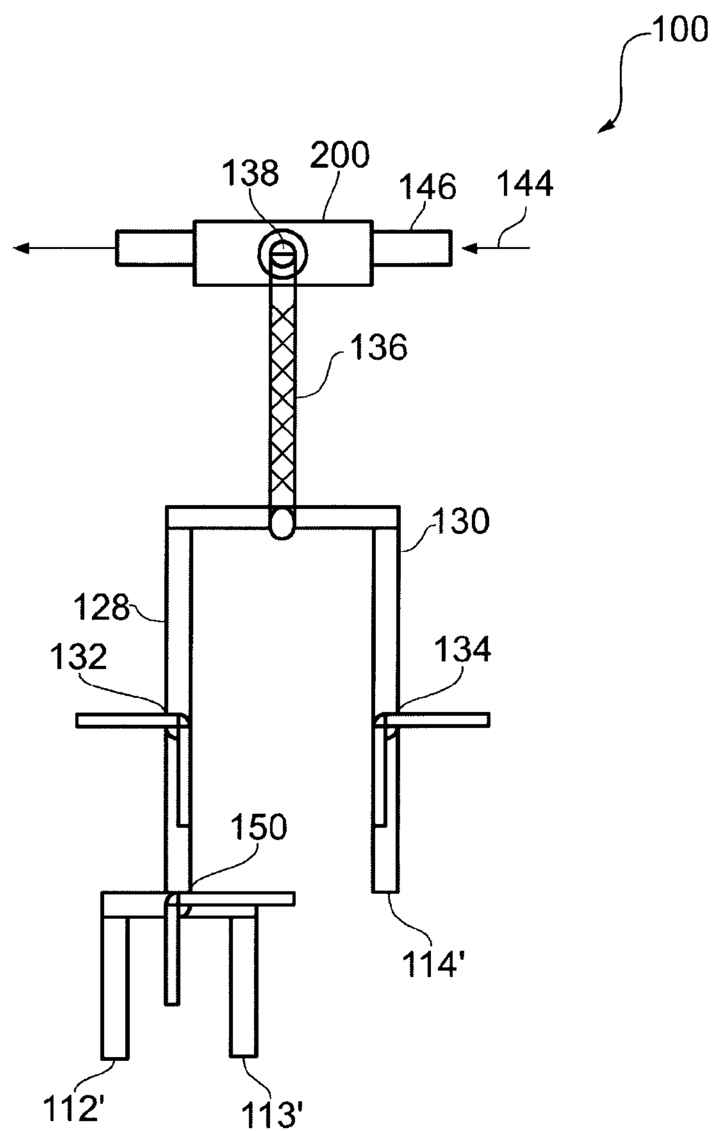
FIG. 4 is a schematic diagram of a further embodiment of a spray head assembly in accordance with the present invention.

FIG. 1 shows a schematic diagram of an embodiment of an injection system 10 having two pressure pots 12, 14. Each pressure pot 12, 14 has a respective inlet 16, 18 at one side and a respective outlet 20, 22 at a substantially opposite side. A dry gas supply tube 24, having an integrated pressure regulator 26, is in fluid connected at each of respective inlets 16, 18 of pressure pots 12, 14 and a dispensing tube 28, 30 is connected at the respective outlets 20, 22 of pressure pots 12, 14. The dispensing tubes 28, 30 are of differing diameter dependent upon the required ratio of material to be dispensed from the pressure pots 12, 14. A non-return valve 32, 34 is integrated into each respective dispensing tube 28, 30 prior to both dispensing tubes 28, 30 entering a mixer tube 36. In greater detail, FIG. 2 illustrates that the terminal end of the mixer tube 36 is attached to a nozzle 38 having a flattened oval cross-section. The nozzle 38 passes through a preferable airtight hole in the wall of a carrier air supply pipe 40.

In operation, a dry compressed gas supply 42 feeds the dry gas supply tube 24 and so dry gas passes through the pressure regulator 26 and, following a division in the gas supply tube, passes through inlets 16, 18 of each respective pressure pot 12, 14. In this exemplary embodiment, the first pressure pot 12 contains a hardener compound and the second pressure pot 14 contains polyurethane. The pressure of the dry gas entering the pressure pots forces the hardener and polyurethane to exit the pressure pots into the respective dispensing tubes 28, 30 and through the non-return valves 32, 34. The mixer tube 36 functions to evenly combine the hardener and polyurethane. Still under pressure, as controlled by the pressure regulator, this mix then passes through the nozzle 38. The flattened oval-shape of the nozzle exit provides a fan-shaped spray of lining mix.

A high velocity airflow 44 is established along the carrier air supply pipe 40 and consequently the mix spraying out through the nozzle 38 is carried by the airflow through the carrier air supply pipe 40. The exit of this carrier air supply pipe is connected to a pipe which requires lining. Thus, the polyurethane mix carried by the airflow enters the pipe and is deposited as an even coating on the pipe wall. Further polyurethane mix carried by the airflow flows through the pipe until it reaches the leading edge of the coated internal wall. At this point, due to the increase in internal diameter between the coated and uncoated pipe, the airflow accelerates to a turbulent flow and deposits the polyurethane mix onto the pipe wall. This lining process is additionally assisted by the different adhesion characteristics of the coated and uncoated pipe. Namely, the polyurethane mix adheres to the uncoated pipe with greater efficacy than to the coated pipe wall area. In this way, a progressive and even coating of polyurethane mix is deposited on the inner surface of the pipe length.

In an alternative embodiment, the high velocity airflow can be established in the pipe which requires lining and the nozzle can be arranged to feed the lining mix directly into the same pipe. This removes the need for a carrier air supply pipe.

In a preferred embodiment, the dry gas supply pressure is 7 Bar and the carrier air supply pressure is 2 Bar. Generally, the pressure of the injection system is regulated by the pressure regulator to be between 3 Bar and 5 Bar greater than the carrier air supply pressure. A dry gas supply is required to avoid condensation forming in the pressure pots.

As described above, the dispensing tubes are of differing inner diameter dependent upon the required ratio of material to be dispensed from the pressure pots. In an exemplary embodiment, a 4:1 ratio of polyurethane to hardener would be realized by a first dispensing tube of inner diameter 8 mm and a second dispensing tube of 2 mm.

The skilled person would be aware that the lining mix may be of a different type to the polyurethane and hardener of the described embodiment. Other suitable materials may be used, either alone or in combination. Thus, alternative embodiments may include one or several pressure pots. Furthermore, the temperature of the carrier airflow may be controlled to provide the required temperature for the specific usage of the lining arrangement. Specifically, the temperature of the carrier airflow can be altered dependent upon the type of lining mix, the length of the pipe to be lined, the ambient temperature, etc.

The velocity of airflow in the carrier air supply is preferably between 20 and 40 meters per second.

It is noted that the non-return valves function to avoid blow back of material through the dispensing tubes. Furthermore, it will be apparent to the skilled person that the components of the present injection system do not necessarily need to have the orientation illustrated in FIG. 1, as the gas pressure would also force the pressure pot contents through the dispensing tubes and mixer tube in other orientations.

In a preferred embodiment of the present invention, the mixer tube is a static mixer tube and in particular, a Kenics™ static mixer tube.

FIG. 3 shows a schematic diagram of the injection system 10 of the present invention operating to line a buried domestic water supply pipe 46 between a water main 48 and a stopcock 50 at a domestic property. In this operational arrangement, where the start of the pipe to be lined 46 is difficult to access, it is most convenient to utilize a flexible connection tube 52 between the carrier air supply pipe 40 and the start of the pipe to be lined. At the terminal end of the water supply pipe 46, a clear monitoring pipe 54 is attached between the stopcock 50 and an exhaust filter 56.

In operation, the lining mix carried by the airflow originating from the injection system 10 is fed via the flexible connection tube 52 to the start of the pipe 46 to be lined. The lining process proceeds until it is observed that the lining process has reached the clear monitoring pipe 54. At this time the injection system 10 is switched off to stop the injection of further lining material in the carrier air supply pipe 40. In a preferred embodiment, the following step is taken in order to assist in curing the lining mix. The carrier air supply 58 continues to supply an airflow but at a reduced pressure, for example, less than 0.5 Bar, and thus hot air is blown through the lined pipe 46 to cure the lining mix. Typically, this takes approximately 5 minutes. Finally, all equipment is disconnected from both ends of the lined pipe.

FIG. 4 shows a further embodiment of an injection system in the form of a spray head 100 in accordance with the present invention. Pressure pots 112, 113 and 114 (not shown) are provided which supply cleaner fluid 112', activator 113' and base product 114', respectively, under pressure by means of respective pumps (not shown) to mixer tube 136 via dispensing tubes 128, 130. It will be noted that due to the presence of selective valve 150 delivery of both cleaner fluid 112' and activator 113' at the same time is not possible. Selective valve 150 may be operated to select either cleaner fluid 112' or activator 113' for delivery through dispensing tube 128.

The supply of base product 114' to mixer tube via dispensing tube 130 is controlled by valve 134. Similarly, the delivery of either cleaner fluid 112' or activator 113' via dispensing tube 128 to mixer tube 136 is controlled by valve 132.

The combination of activator and base product when mixed provide a quick-setting polyurethane lining material, which sets within 5 to 10 seconds.

Spray head 100 is provided with a nozzle 138 which is located within spray head shuttle 200 which is, in turn, located contiguously with domestic water supply pipe 146 through which a high velocity air flow 144 is provided.

Figure 7:
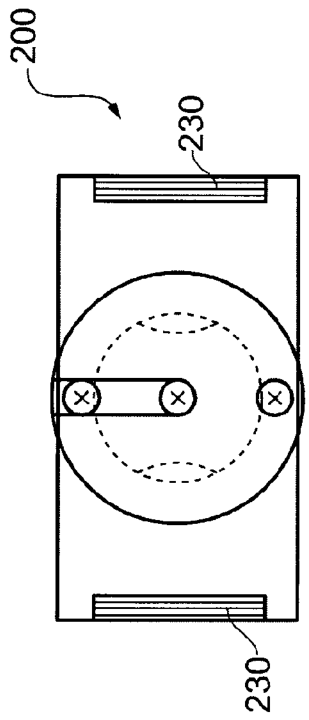
FIG. 7 is a plan view of the embodiment of FIG. 5.
Figure 6:
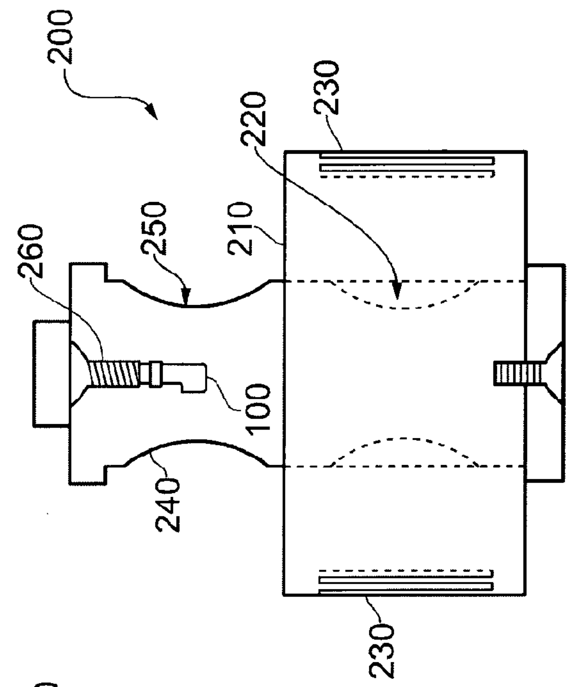
FIG. 6 is a side elevation of the embodiment of FIG. 5.
Figure 5:
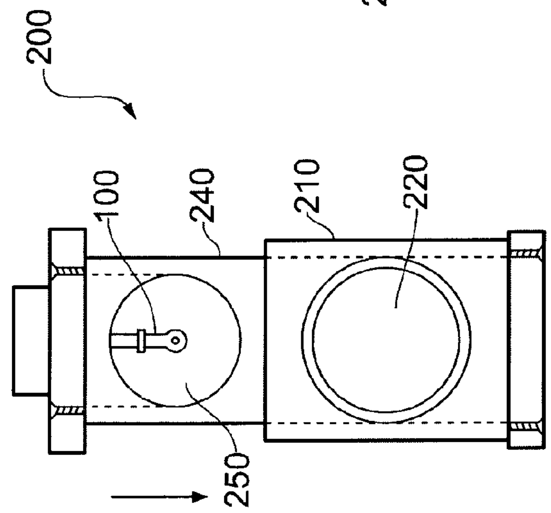
FIG. 5 is a front-elevation of a further embodiment of an instrument locating apparatus the present invention.

Spray head shuttle 200 is shown in more detail in FIGS. 5 to 7.

Spray head shuttle 200 comprises a housing 210 defining a housing cavity 220. Spray head shuttle 200 is provided with pipe engagement regions 230 which, in use, sealably engage with domestic water supply pipe 146 in a conventional manner such that housing cavity 220 is contiguous with the cavity within domestic water supply pipe 146 (not shown).

Spray head shuttle 200 is further provided with a body portion 240 which is received in part within housing 210 and is slideable relative to housing 210 in a direction shown by the arrow in FIG. 5. It will be appreciated that once moved in the direction shown by the arrow in FIG. 5, the body portion 240 may be returned to its initial position (as shown in FIG. 5) by slidably moving body portion 240 in the opposite direction to that shown in the arrow.

Body portion 240 defines a cavity 250 therein and is provided with an instrument retention portion 260 in which an instrument such as spray head 100 of FIG. 4 may be retained, in use.

Thus, in use:

1. Spray head shuttle 200 should be located within a break in domestic water supply pipe 146 such that housing 210 is in sealed engagement with domestic water supply pipe 146 by bringing pipe engagement portions 230 of housing 210 into sealed engagement with domestic water supply pipe 146 such that cavity 220 of housing 210 is contiguous with domestic water supply pipe 146;
2. A controlled air flow of selected flow rate is then provided though domestic water supply pipe 146;
3. Spray head 100 should be positioned within instrument retention portion 260 of body portion 240 of spray head shuttle 200;
4. Valves 132 and 134 of spray head 100 should be closed and pressure pots 112, 113, 114 filled with cleaner fluid 112', activator 113' and base product 114' respectively;
5. Once the pressure pots 112, 113, 114 are filled the pump (not shown) is activated to pressurize the cleaner fluid 112', activator 113' and base product 114' respectively. Since valves 132 and 134 are closed, cleaner fluid 112', activator 113' and base product 114' will be recycled within pressure pots 112, 113, 114 respectively until needed;
6. Pressure pot actuators and heaters (not shown) are now turned on to ensure that the activator 113' and base product 114' remain fluid and heat to the required temperature for use in lining the domestic water supply pipe 146;
7. Base product 114' is diverted from recycling at pressure pot 114 to mixer tube 136 by opening valve 134. Base product 114' will then be discharged from nozzle 138 of spray head 100. This discharged base product 114' should be collected in a container;
8. Valve 132 should be opened to allow flow through dispensing tube 128 and valve 150 operated to allow the selective flow of activator 113' through dispensing tube 128 to mixer tube 136. Base product 114' and activator 113' will mix at mixer tube 136 and mixed lining paint will now be discharged from nozzle 138 of spray head 100. This discharged mixed lining paint should be collected for around 90 seconds to ensure a consistent mix has been achieved, a sample should then be collected over a 5 to 10 second time period and stored;
9. Body portion 240 of spray head shuttle 200 should then be slideably moved relative to housing 210 to bring cavity 250 of body portion 240 into housing cavity 220 of housing 210 until the cavity 250 and housing cavity 220 are aligned with one another. Spray head 100 is then accurately located within housing cavity 220 of housing 210. Nozzle 138 of spray head 100 will then be accurately located within airflow 144 through domestic water supply pipe 146 and the mixed lining paint will be delivered into the air flow 144 and distributed on the interior walls of domestic water supply pipe 146 as described previously;
10. Once sufficient material has been released to coat the required length of domestic water supply pipe 146, body portion 240 of spray head shuttle 200 is moved relative to housing 210 by sliding body portion in a direction opposite to that shown by the arrow in FIG. 5. This will lift cavity 250 out of housing cavity 220 and remove nozzle 138 of spray head 100 from air flow 144 through domestic water supply pipe 144. Discharged mixed lining paint should then be collected once more and a sample taken and stored;
11. Valve 150 should then be operated to selectively stop the flow of activator 113' through dispensing tube 128 and allow cleaner fluid 112' to flow through dispensing tube 28 to mixer tube 136 and the air supply to cleaning pump (not shown) switched on to flush the mixer tube 136 and nozzle 138 with only base product 114' and cleaner fluid 112';
12. Once all traces of activator 113' have been removed from dispensing tube 128, mixer tube 136 and nozzle 138, valve 134 may be operated to prevent flow of base product 114' though dispensing tube 130 and pressure pot 144 returned to recycle mode;
13. Cleaner fluid 112' should be flushed through mixer tube 136 and nozzle 138 until they are cleaned which will be visible as the discharged solution from nozzle 138 will become clear;
14. Valve 132 can then be closed to prevent further flow of cleaner fluid to the mixer tube 136 and the air supply (not shown) to pressure pot 114 switched off.

It will be apparent to the skilled person that the present invention also provides benefit in minimizing the amount of lining mix that is wasted in the lining process. Specifically, the pressure parameters of the dry gas supply and the carrier air supply may be adjusted to ensure that the correct density of lining mix droplets in the carrier airflow results in the required thickness of lining mix adhering to the pipe walls. In this way there is a negligible amount of lining mix carried in the exhaust airflow into the exhaust filter.

It will be appreciated that the spray head may be replaced by any instrument which requires location within a pipe, such as but not restricted to, a sensor (including a temperature sensor, air sensor, moisture sensor or the like), a sampling device (including an air sampling device, fluid sampling device, or the like), an injecting device (to inject an additive or the like into the pipe), a camera such as a fiber optic camera device or the like to view the inside of the pipe, or any other suitable instrument which requires reliable location within a pipe.

Improvements and modifications can be made to the foregoing without departing from the scope of the present invention.

The invention claimed is:

1. An apparatus for locating an instrument within a pipe, the apparatus comprising:

a. a housing portion defining a housing cavity therein;

b. a pipe engagement region for slideable engagement with a pipe such that the housing cavity is contiguous with the pipe; and c. an instrument retention portion within an instrument cavity in slideable engagement with the housing portion, and in which said instrument retention portion is arranged to receive at least a portion of an instrument therein so as to retain the instrument in position relative to the instrument cavity;

wherein, in use with a pipe defining a pipe cavity therethrough, the instrument retention portion is slideable relative to the housing portion between a first configuration where the instrument cavity is external to the housing cavity and a second configuration where the instrument cavity is located within the housing cavity and the instrument cavity and housing cavity are aligned with the pipe cavity.

2. The apparatus according to claim 1, further comprising an instrument received within the instrument retention portion and extending at least in part into the instrument cavity.

3. The apparatus according to claim 1, wherein the instrument comprises a spray head to deliver a coating material for the pipe.

4. The apparatus according to claim 1, wherein in the first configuration the whole of the instrument cavity is located outside of the housing cavity.

5. The apparatus according to claim 1, wherein in the second configuration the whole of the instrument cavity is located within the housing cavity.

6. A spray head shuttle for locating a spray head within a pipe, comprising:

a. a housing portion having pipe engagement portions to sealably engage the shuttle with a pipe, the housing defining a housing cavity; and b. an instrument retention portion within an instrument cavity in slideable engagement within the housing portion, and in which said instrument retention portion is arranged to receive at least a portion of a spray head therein and to retain the spray head in position relative to the instrument cavity, wherein, in use with a pipe defining a pipe cavity therethrough, the instrument retention portion is slideable relative to the housing portion between a first configuration where the instrument cavity is external to the housing cavity and a second configuration where the instrument cavity is located within the housing cavity and the instrument cavity and housing cavity are aligned with the pipe cavity.

7. The spray head shuttle according to claim 6, further comprising a spray head received within the instrument retention portion and extending at least in part into the instrument cavity.

8. The apparatus according to claim 6, wherein the instrument comprises a spray head.

9. The spray head shuttle according to claim 6, wherein in the first configuration the whole of the instrument cavity is located outside of the housing cavity.

10. The spray head shuttle according to claim 6, wherein in the second configuration, the whole of the instrument cavity is located within the housing cavity.

11. A method of locating an instrument within a pipe, the pipe defining a pipe cavity, the method comprising:

providing one of an apparatus for locating an instrument within a pipe or a spray head shuttle for locating a spray head within a pipe, in which the apparatus includes a housing portion defining a housing cavity therein, a pipe engagement portion for slideable engagement with an end of a pipe such that the housing cavity is contiguous with the pipe, and an instrument retention portion within an instrument cavity in slideable engagement with the housing portion, and in which said instrument retention portion is arranged to receive at least a portion of an instrument therein so as to retain the instrument in position relative to the instrument cavity, the spray head includes a housing portion having pipe engagement portions to sealably engage the shuttle with a pipe, the housing defining a housing cavity, and an instrument retention portion within an instrument cavity in slideable engagement within the housing portion, and in which said instrument retention portion is arranged to receive at least a portion of a spray head therein and to retain the spray head in position relative to the instrument cavity;

sealing engaging the apparatus or spray head shuttle with the end of a pipe using the pipe engagement portions;

providing an instrument;

bringing the instrument into engagement with the instrument retention portion; and sliding the instrument retention portion relative to the housing portion to bring at least a portion of the instrument into the housing cavity and in line with said pipe.

12. The method according to claim 11, wherein the housing cavity is contiguous with the pipe cavity following engagement of at least one of the apparatus or spray head shuttle with the pipe.

* * * * *